United States Patent [19]

Mertens et al.

[11] Patent Number: 4,608,857
[45] Date of Patent: Sep. 2, 1986

[54] METHOD FOR CHECKING PIPES OR PIPE NETWORKS FOR LEAKS

[75] Inventors: Peter Mertens; Wilfried Meuser, both of Bremen, Fed. Rep. of Germany

[73] Assignee: Fried. Krupp GmbH, Essen, Fed. Rep. of Germany

[21] Appl. No.: 547,096

[22] Filed: Oct. 31, 1983

[51] Int. Cl.$^4$ .............................................. G01M 3/00
[52] U.S. Cl. .................... 73/40.5 R; 73/49.1
[58] Field of Search ............... 73/40.5 R, 49.1, 49.5, 73/40

[56] References Cited

U.S. PATENT DOCUMENTS

| 3,702,074 | 11/1972 | Mullen | 73/40.5 R |
| 3,958,449 | 5/1976 | Drescher et al. | 73/40.5 R |
| 3,962,905 | 6/1976 | Jouve | 73/40.5 R |

FOREIGN PATENT DOCUMENTS 2741546  3/1979  Fed. Rep. of Germany.
27041    2/1983  Japan ................................. 73/40.5 R

*Primary Examiner*—Stewart J. Levy
*Assistant Examiner*—Hezron E. Williams
*Attorney, Agent, or Firm*—Spencer & Frank

[57] ABSTRACT

A method is provided for leak checking pipes or pipe networks wherein the leak check is effected by means of liquid under pressure in that a pressure change is determined. To improve the leak check by excluding temperature caused pressure changes, the liquid pressure in the pipes, pipe networks or pipe sections thereof is set to at least two different pressure levels as initial pressure for at least one respective pressure change determination. From the time standardized pressure changes associated with different initial pressures, a time standardized pressure change difference is formed and is compared with an allowed value with reference to the unit of time. A leak is determined to exist if the pressure change difference is greater than the allowed value.

13 Claims, 2 Drawing Figures

$$\Delta p_2' = \frac{1}{2}(\Delta p_3 + \Delta p_1)$$
$$\Delta p = \Delta p_2' - \Delta p_2$$

METHOD FOR CHECKING PIPES OR PIPE NETWORKS FOR LEAKS

BACKGROUND OF THE INVENTION

The invention relates to a method for checking pipes or pipe networks for leaks by filling them with liquid, placing the liquid under pressure at least in individual, separable pipe sections, and determining a change in pressure. Pipes and pipe networks are here understood to mean all types of unbranched and branched conduits of any desired cross section in which gas, liquids or dust particles are transported or which are intended for such purposes.

In a known method of this type (1) for checking the tightness of pipelines, the tightness of a pipe system is checked in that the pipe section to be checked is filled with a liquid which is put under pressure. If liquid escapes due to a leak, the excess pressure existing in the pipe will drop over time. From the drop in pressure per unit of time and from the known data regarding the pipe system and the liquid, a conclusion can then be drawn with respect to the presence and magnitude of a leak.

(1) "Das DD-Differenz-Druck-Verfahren zur Dichtigkeitskontrolle von im Boden verlegten Rohöl-Fernleitungen", [The DD Pressure Difference Method for Monitoring the Tightness of Underground Long-Distance Petroleum Conduits], Schweizer Archiv, April 1963, pages 131–139.

The pressure test is made more difficult by the fact that changes in pressure occur even without a leak if pipe contents and pipe surroundings, e.g. soil, are not at the same temperature. The temperature equalization processes taking place between the interior of the pipe and the surroundings of the pipe cause the pressure in the conduit system or in the respective pipe section, to rise or drop. This is the case, for example, at airports where fuel is stored in tanks and is distributed to taps over an underground pipe network of several kilometers in length. Refueling processes constantly cause fuel at the tank temperature to enter the pipe system which is relatively cooler in summer and warmer in winter. Moreover, fuel quantities are stored for different lengths in the individual pipe sections, depending on the prior history of the refueling processes and consequently are able to adapt themselves more or less to the temperature of the surrounding soil. As shown in (1), a change in temperature of only 0.1° K. in crude oil lines results in a change in pressure of 1 bar, independently of the volume of the pipe network. On the other hand, the same drop in pressure occurs, for example, in a pipe section containing 100 m$^3$, whenever about 10 liters have been discharged. If a leak determination is now to be made for leaks which are less than or equal to 10 l/h, it must either be assured that the temperature in the pipe section will change by much less than 0.1° K./h, or the mean temperature in the pipe section must be determined with great precision and pressure fluctuations caused thereby must be corrected by calculation. In the former case, as shown in (1), temperature equalization can be positively brought about by waiting, typically for three days, since, due to the thermostatic properties of the soil, the temperature will then remain sufficiently constant. In the second case, it is necessary in any case to have a sufficient density of measuring locations along the pipelines. Finally, a combination of both methods can also be used.

However, in the refueling system of an airport, it is untenable to have even parts only of the pipe network unused for several days. Also, installation and operation of a sufficiently tight and accurate network of temperature measuring locations would involve high expenditures.

SUMMARY OF THE INVENTION

It is the object of the invention to provide a method of the above-mentioned type with which leaks, even those of relatively slight magnitude, can be safely and reliably detected in the shortest possible time and at low technical expenditure even if the temperature of the pipe contents itself changes during the testing process.

This is accomplished, according to the invention, by a method for checking at least one isolatable section of a pipe or pipe network for leaks, by filling the section with a liquid, and effecting at least one pressure change determination by the steps of: placing the liquid in the section at a first initial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section.

Even the smallest leak flow of about 1 l/h can be detected with the method according to the invention. The only prerequisite is that suitable pressure sensors be available which exhibit sufficiently consistent accuracy relative to the maximum excess pressure in the pipe network and that the volume to be blocked off be sufficiently small. Commercially available pressure sensors having a consistent accuracy of 0.1% at 10 bar maximum excess pressure are already acceptable for this purpose. For each measuring interval, a time duration of the order of magnitude of 10 minutes is sufficient.

The method according to the invention is independent of temperature, thus requiring neither the previously required immense expenditures for an extensive network of measuring locations to measure the temperature in the pipe system nor the acceptance of long waiting times for the equalization of temperatures between pipe contents and pipe environment. In contrast to leakage-caused changes in pressure, temperature-caused changes in pressure do practically not depend on the initial pressure in the pipe section. Since in the method according to the invention a difference is formed between the time-standardized pressure drops for two different initial pressures, temperature-caused components essentially stand out. This results in absolutely reliable results as long as the measuring period, i.e. the sum of the time durations of the preferably immediately consecutive measuring intervals, is very small compared to the half value period of a temperature equalization process between interior and exterior of the pipe and thus a quasi linear temperature-caused pressure curve exists for the measuring period.

If this assumption cannot be made with sufficient certainty, because, for example, due to a very small permissible leakage flow, a large volume of liquid, or pressure sensors with low measuring accuracy, the time duration of the measuring intervals must be selected to be relatively large, the reliability of the method according to the invention can be improved, according to a further feature which involves, as part of the step of effecting at least one pressure change determination, again placing the liquid in the section at the first initial pressure value after the second measuring interval and then detecting the change in pressure from the first initial value during a third measuring interval, and, as part of the step of providing representations, deriving, from the pressure changes detected during the first and third intervals, as the adjusted representation of the change in pressure from the first initial value, a representation of an approximation of the pressure change from the first initial pressure value which would occur during the second measuring interval. With these measures, the change in pressure at different initial pressures is detected quasi during the same measuring interval with the same time limits and thus the influence of changes in temperature on the pressure curve is almost completely eliminated. Since, however, the changes in the initial pressures and the detection of the respectively associated pressure changes can be performed practically only in time succession, and not simultaneously, the detection of pressure changes for the one initial pressure is performed once before and once after the moment of detection of a change in pressure for the other initial pressure and is converted to the time period of the detection of a change in pressure for the last-mentioned initial pressure so that the changes in pressure for both initial pressures are detected "pseudosimultaneously".

According to an advantageous feature of the method according to the invention, the first and second measuring intervals are of identical duration, and the allowed pressure change difference value is time standardized to the same duration. By setting constant measuring intervals, the standarization of the changes in pressure to a reference unit of time becomes superfluous and evaluation is facilitated.

Another advantageous feature of the method according to the invention involves providing the representation associated with at least one interval by a calculation which is based on a plurality of pressure values measured during the associated interval and which minimizes the influence of unavoidable measuring errors. With the provided regression calculation, a change in pressure can be determined even if statistic fluctuations in the pressure curve and/or in the measured value display are superposed, so as to provide useful results for leakage check and detection.

An advantageous feature of the method according to the invention resides in performing the step of forming a representation of a time standardized allowed pressure change difference value by calculating that value on the basis of selected values for the permissible maximum leakage flow from the section, the maximum operating pressure in the section, the liquid volume of the section, the duration of each measuring interval, and each initial pressure value. By fixing the allowed value in this way, even residual errors remaining in the approximation calculation described above are eliminated and cannot produce detection errors. The allowed value $\Delta p_v$ can be calculated from the history of the leakage channel. If turbulent flow conditions exist in the leakage channel, the quantity of liquid flowing out per unit time is proportional to the square root of the pressure difference between interior and exterior of the pipe and the allowed value is calculated as follows:

$$\Delta p_v = \frac{K \cdot t}{V \cdot B} ( \sqrt{p_{a1}} - \sqrt{p_{a2}} ) \tag{1}$$

where:
the constant K is the quotient of the maximum permissible leakage flow (e.g. 1 l/h) and the square root of the maximum pressure occurring in the pipe network, V is the liquid volume in the closed pipe section, t is the period of time and $p_{a1}$ and $p_{a2}$ are two different initial pressures.

The constant B is a value which depends on the geometry of the pipe network and is calculated as follows:

$$B = \frac{D}{d \cdot E} + b \tag{2}$$

where:
D is the diameter of the pipeline,
d is the wall thickness of the pipeline,
E is the modulus of elasticity of the pipe material,
b is the compressibility of the liquid contained in the pipe network.

With a liquid volume of $V = 40$ m$^3$, a permissible leakage flow of 10 l/h, a first initial pressure of $p_{a1} = 9$ bar and a second initial pressure of $p_{a2} = 3$ bar, a time duration of the measuring intervals of $t = 10$ minutes, and a value of $B = 1.19 \cdot 10^{-4}$ bar$^{-1}$, the allowed value results as $\Delta p_v = 0.147$ bar.

Generally, i.e., without the fixed assumption of turbulent flow, Equation (1) can be written with $$K = \frac{L/t}{p^u} :$$

$$\Delta p_v = \frac{\left(\frac{L}{t}\right) \cdot t}{V \cdot B} \cdot \frac{p_{a1}^u - p_{a2}^u}{p^u} \tag{1a}$$

where, depending on the type of flow in the leak, u may take on a value between 0.3 and 0.8 and, for pure turbulence, is 0.5. L is the leakage quantity, (L/t) is the quantity leaked per unit time, i.e. the leakage flow, and p, as mentioned above, is the maximum pressure occurring in the pipe network. If one wishes to detect leaks beginning at a given minimum value in pipe systems that are always under a constant operating pressure, as this is the case for underground fuel networks at airports, it is advisable to use, instead of the maximum occurring pressure, the operating pressure $p_B$ of the pipe system as pressure p.

Knowledge of the type of liquid flow in the leak is required only if leaks of a given magnitude are to be detected within close tolerances. Otherwise, the assumption of turbulent flow is entirely sufficient. The error made thereby can be calculated as follows:

$$\Delta p_{v(u)} = \Delta p_{v(0.5)} \cdot \frac{p^{0.5}(p_{a1}^u - p_{a2}^u)}{p^u(p_{a1}^{0.5} - p_{a2}^{0.5})} \tag{1b}$$

With the above-made assumptions for $p_v$, $p_{a1}$ and $p_{a2}$, the resulting error for $\Delta p_v$ is $-34\%$ and $+47\%$, i.e. under certain circumstances not only leaks involving leakage losses of more 10 l/h are detected but also those involving leakage losses of more than 15 l/h (u=0.3) or even leaks involving leakage losses beginning at $\approx 7$ l/h (u=0.8).

Another advantageous feature of the method according to the invention is that the allowed value is set to approximately zero. If the allowed value is set to approximately zero, even the smallest leakage flows can be reliably detected. Prerequisite for the reliability of this allowed value and thus for the avoidance of a high rate of false alarms, however, is, on the one hand, that temperature-caused changes in pressure over time be constant, i.e. the temperature-caused pressure curve be absolutely linear, and, on the other hand, measuring inaccuracies are eliminated.

Another advantageous feature of the method according to the invention resides in providing a representation of the estimated quantity of liquid which would leak from the section during a reference time period and when under normal operating pressure, by forming the product of the time standardized pressure change difference value, the reciprocal of the difference between the square roots of the first and second initial pressure values, and a constant which is characteristic of the particular section, particularly in conjunction with determining the constant as the product of: a preliminary constant which is a function of the geometry and material composition of the section and the compressibility of the liquid; the liquid volume in the section; and the square root of the normal operating pressure in the section. With these measures, it is possible to estimate, if a leak is detected, the quantity leaked under operating conditions out of the pipe system or pipe section per unit time. This permits the making of reliable and well considered decisions with respect to continuation or shutting down of the pipe system. For example, knowledge of the magnitude of the leak is an aid in the decision to partition off a pipe section or to pump it out immediately because the leak is too large. On the other hand, the detected leak, due to the small quantity being leaked out, can merely be noted and trends in the behavior of the leak can be detected by the use of appropriate calculations with respect to the leakage flow.

An advantageous feature of the method according to the invention includes as part of the step of comparing, reducing the pressure change difference value representation by a correction factor proportional to the difference between the first and second initial pressure values, particularly in conjunction with using a correction factor which is equal to the product of a constant C, and the difference between the first and second initial pressure values. With these measures, so-called creeping observed in practice in buried pipes or pipe networks, which has a falsifying effect on the measurement of pressure changes, is compensated by calculation. Such creeping processes become noticeable in pressure changes in a pipe or pipe network at stable temperature in that initially the pressure is higher (pressure increase) or lower (pressure decrease) than the allowed pressure, with such pressure subsequently decreasing or increasing again, respectively, with a time constant of about 0.5 l/h and then remaining constant.

Compensation of creeping permits, on the one hand, a reduction in the false alarm rate as well as a more accurate estimate of the quantity leaked out per unit time and, on the other hand, measurements in only short time intervals, with the measuring phases beginning already a few minutes after setting of the initial pressures and the spacing of the initial pressure settings from one another, the so-called measuring intervals, need not be any greater than 10 minutes.

The constant C, with which the difference of the initial pressures must be multiplied, is specific to the pipe network and can be determined empirically, according to a further feature of the invention by performing a plurality of pressure change determinations on the section when it is leak-free at different initial pressure values and determining pressure change difference values based on those initial pressure values. Experiments have shown that the constant C is essentially independent of the configuration of the pipe network and of the pipe, but depends to a certain degree on the structure of the soil surrounding the pipe network. For a pipe system embedded in sand, the constant C has been determined at $16 \cdot 10^{-6} \, s^{-1}$.

In the practice of the invention, there will be certain advantages in setting the time standardized allowed pressure change difference value to approximately zero.

Good results can be achieved if each of the initial pressure values is set at less than 10 bar and the ratio of one initial pressure value to the other is approximately 1:3.

BRIEF DESCRIPTION OF THE DRAWING

The invention will be described in greater detail below with reference to the drawing and with the aid of an embodiment for leak monitoring in an aircraft refueling system at an airport. It is shown in.

DESCRIPTION OF THE PREFERRED EMBODIMENTS

Figure 1:
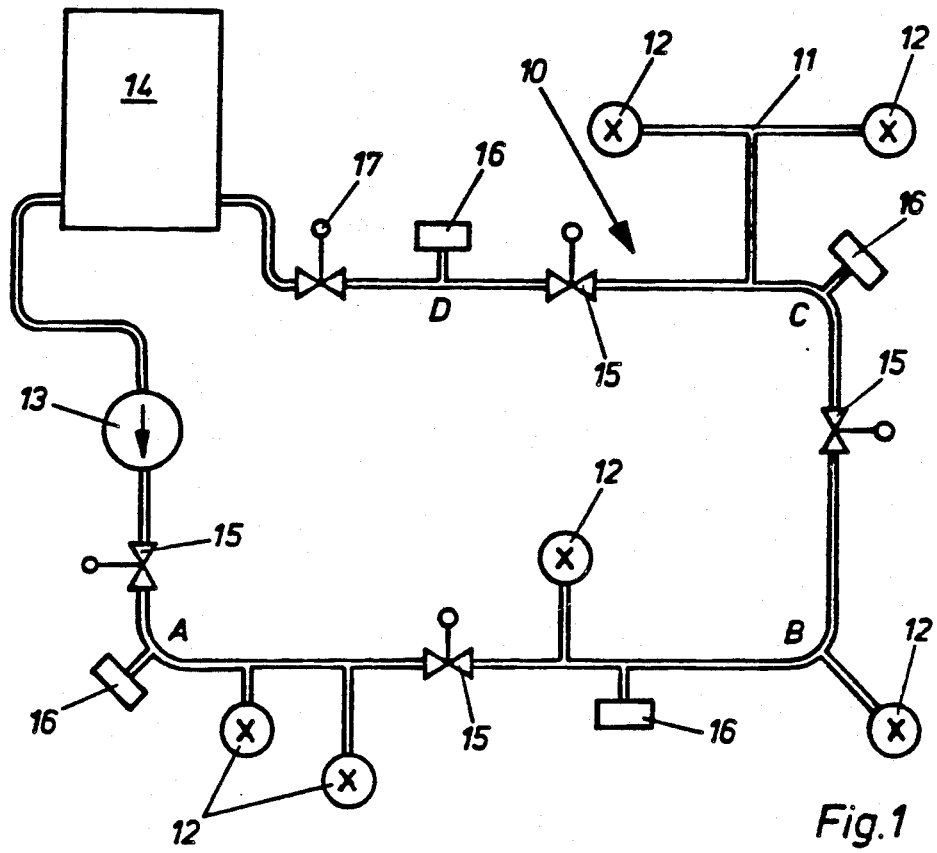
FIG. 1, a schematic representation of the refueling system of an airport.

The refueling system of an airport, as shown schematically in FIG. 1, includes a pipe network 10 buried underground and comprising a plurality of interconnected, branched pipelines 11. Hydrants 12 are connected to the end of pipelines 11, some of which are designed as tap lines. The aircraft are refueled through so-called servicers which receive the fuel from hydrants 12, finely clean it, reduce it to fuel tank pressure and then conduct it into the aircraft fuel tank. The pipe network 10 is supplied with fuel via at least one primary pump 13 from a fuel tank 14 situated above ground. Primary pump 13 also assures that the required excess pressure exists in pipelines 11 of pipe network 10. Pipe network 10 may be subdivided by means of remote controlled stop valves 15 into individual pipe sections having predetermined liquid volumes V. In FIG. 1, the pipe network 10 is subdividable into four pipe sections A through D. Each pipe section is provided with a pressure sensor 16 to measure the pressure.

A leak check is made once a day during a longer refueling pause, usually lasting several hours, in which no fuel is taken from pipe network 10 due to the absence of traffic at the airport. By means of primary pump 13 and with stop valves 15 opened, the pressure in all pipelines 11 of the pipe network 10 is set to a first initial pressure $p_{a1}$ of, for example, 9 bar. Then all stop valves 15 are closed resulting in four hermetically sealed pipe sections A through D which have a liquid volume that is sufficiently small compared to the measuring accuracy and the permissible maximum leakage flow, and which may be different in the individual pipe sections A through D; in the illustrated example it is 40 m³. The sufficiently small liquid volume can be estimated with the aid of Equation (1) if the measuring accuracy of the pressure sensors 16 employed is known and the allowed value $\Delta p_v$ is set accordingly. Constant K includes the permissible leakage flow, and B is determined by the geometry of the pipe network and the type of liquid.

A leak test is now made in every pipe section A through D, as described below for the leak test in pipe section A.

In a first measuring interval of a duration of, e.g., 10 minutes, the pressure change $\Delta p_1$ is measured by means of pressure sensor 16, starting from the first initial pressure $p_{a1}=9$ bar. Then all stop valves 15 are opened again and the pressure in pipe sections A through D is lowered to a second initial pressure $p_{a2}$ of, e.g., 3 bar, which can be effected by controlled opening of a further stop valve 17. If the pressure in pipe network 10 is 3 bar, all stop valves 15 are closed again. Now, in a second measuring interval of the same duration of 10 minutes, the pressure change $\Delta p_2$, starting from the second initial pressure $p_{a2}=3$ bar is measured by means of pressure sensor 16 in pipe section A.

From the pressure changes $\Delta p_1$ and $\Delta p_2$ detected in the two measuring intervals, a pressure chance difference $\Delta p$ is now formed and is compared with an allowed value $\Delta p_v$. If a leak exists, the outflowing leakage flow is dependent upon the excess pressure in the pipe section. The greater this excess pressure, the greater are the leakage losses. Since outflow is generally connected with turbulent flow conditions, the leaked quantity is a function of the square root of the pressure difference between the pressure in the pipe system and the ambient pressure. The time curve of the pressure results from the following equation:

$$p = \left(\sqrt{p_a} - \frac{K}{2V \cdot B} \cdot t\right)^2 \quad (3)$$

wherein the values correspond to those allowed for Equations (1) and (2). Due to the dependence of the leakage flow on the initial pressure, the existence of a leak will in any case result in a pressure change difference. In the ideal case, the allowed value $\Delta p_v$ can therefore be made zero. However, to keep the false alarm rate as low as possible (deviations from zero can occur already due to measuring inaccuracies!), the allowed value $\Delta p_v$ is calculated as described above and, for example, for a maximum permissible allowed leakage flow of 10 l/h, a liquid volume in pipe section A of 40 m³, a measuring interval time of 10 minutes as reference unit of time and with the stated two initial pressures, such allowed value $\Delta p_v$ is 0.147 bar. If the pressure change difference $\Delta p$ is greater than this allowed value $\Delta p_v$, a reliable conclusion can be drawn that a leak exists in pipe section A. This process can be repeated several times, thus significantly increasing the reliability of the information.

To improve the detection of a pressure change with respect to the elimination of statistic fluctuations in pressure or in the measured value indication it is also possible to perform several pressure measurements during each measuring interval and to obtain the pressure change during the measuring interval from the pressure values by means of an equalization or regression calculation.

The above-described measuring method is sufficient if it can be assumed that temperature caused pressure changes are essentially constant and that the pressure curve produced by a drop in temperature as a function of time is approximately linear. Even greater deviations from linearity will not result in a falsified result, due to the relatively high permissible leakage flow, since the allowed value is high. If the permissible maximum leakage flow is reduced substantially, e.g. allowed to be 1 l/h, it is advisable to better compensate also for temperature-caused pressure changes. Likewise the slight, principally known pressure dependence of value b in Equation (2) must then also be considered.

Figure 2:
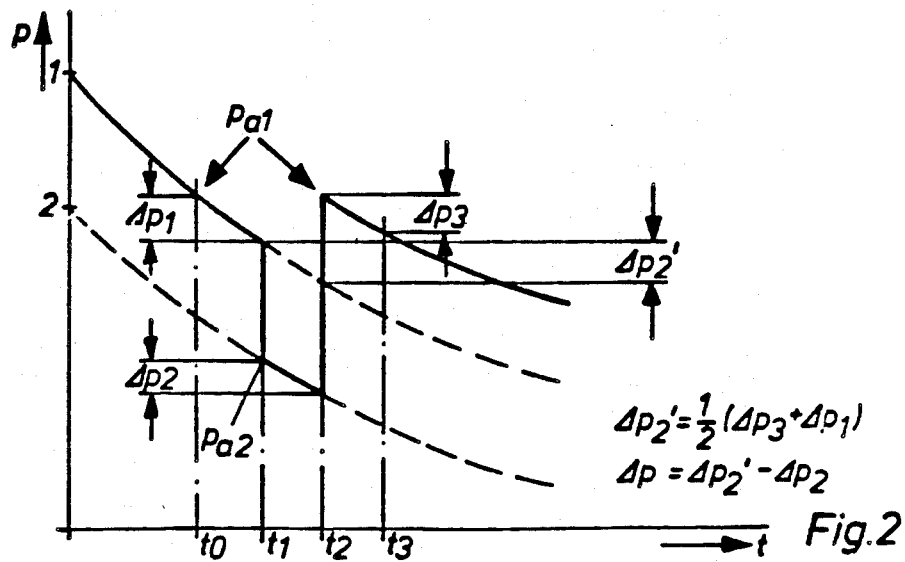
FIG. 2, a diagram of an assumed temperature-caused pressure curve over time in a closed pipe section having a constant liquid volume.

FIG. 2 shows two exemplary pressure curves in pipe section A as a function of time. In this pressure curve it has been assumed that no leak exists in pipe section A and the drop in pressure is caused exclusively by a drop in temperature between the ground and the liquid in pipe section A. It has here been assumed that the pressure curve over time is no longer linear. In this case, as described already above, the pressure change, here pressure drop, is measured in a first measuring interval between times $t_0$ and $t_1$ (10 minutes) at an initial pressure of $p_{a1}=9$ bar, the pressure drop in a second measuring interval between time limits $t_1$ and $t_2$ (10 minutes) is measured at an initial pressure of $p_{a2}=3$ bar and the pressure drop in a third measuring interval having time limits $t_2$ and $t_3$ (10 minutes) and an initial pressure of again $p_{a1}=9$ bar. From the pressure drops $\Delta p_1$ and $\Delta p_3$ determined in the first and third measuring intervals (FIG. 2), the pressure drop in the second measuring interval having the time limits $t_1$ and $t_2$ and an initial pressure of $p_{a1}=9$ bar is now determined by an approximation calculation, e.g. by interpolation. From the thus calculated "pseudo pressure drop" $\Delta p_2'$ during the second measuring interval with the initial pressure of $p_{a1}=9$ bar and the pressure drop $\Delta p_2$ measured in the second measuring interval at an initial pressure of $p_{a2}=3$ bar, the pressure drop difference $\Delta p$ is now calculated. If no leak exists in pipe section A, this difference should be approximately zero; in any case, however, it is significantly less than the allowed value $\Delta p_v$.

If a leak has been detected in pipe section A, the order of magnitude of the leakage quantity L flowing out through this leak under operating conditions of pipe network 10 during the same time period as the measuring intervals, e.g. 10 minutes, can be estimated in that, according to Equation (4) below:

$$L = H \cdot \frac{\Delta p}{\sqrt{p_{a1}} - \sqrt{p_{a2}}} \quad (4)$$

the time-standardized pressure change difference measured during the measuring interval is multiplied by the reciprocal of the difference of the square roots of the initial pressures $p_{a1}$ and $p_{a2}$ and by a constant. The constant x is here system specific and depends on the operating pressure $p_B$ of pipe network 10; it is determined as follows according to Equation (5):

$$x = B \cdot V \cdot \sqrt{p_B} \quad (5)$$

with constant B being calculated according to Equation (2) and V representing the blocked volume of pipe section A.

With the values given above for one embodiment and with an operating pressure for pipe network 10 of 7 bar, constant $\chi$ is determined as follows according to Equation (5):

$$\chi = 12.6 l \cdot bar^{-\frac{1}{2}}$$

In the example, the estimation error for the leakage quantity flowing out during the reference unit of time here lies between $-37\%$ and $+49\%$, which is certainly sufficient for an evaluation of the magnitude of the leak and the measures to be taken as a consequence. The estimation error is due to the fact that in Equations (4) and (5) a turbulent flow is again assumed to exist in the leak. The actual leakage quantity flowing out during the reference unit of time, using Equations (4) and (5), is $$L = B \cdot V \cdot \frac{p_B^u}{p_{a1}^u - p_{a2}^u} \cdot \Delta p, \quad (6)$$

where u may take on values between 0.3 and 0.8, depending on the type of flow in the leak, and 0.5 must be set for turbulence.

Measurements have shown that buried pipe networks encounter creeping which is manifested by the fact that when the initial pressure is set, i.e. the pressure is increased or reduced, in the temperature-stable pipe section, i.e. the pipe section whose temperature is equal to its environment, there will initially develop a pressure which is somewhat higher or lower, respectively, than the initial pressure and which then drops or increases, respectively, with a time constant of about 0.5 to 1 h and then remains constant. If pressure change measurements are made during this period, which is desirable for fast accomplishment of the leak test, creeping processes have a falsifying influence on the measuring result. For example, such creeping processes may simulate a leakage flow of 5-7 l/h in a completely tight pipe section. To compensate for such processes, the measured, time-standardized pressure change difference $\Delta p$ is reduced yet by a factor $\alpha$ before it is compared with the allowed value $\Delta p_v$ or is utilized to estimate the leakage quantity L flowing out per unit time. The factor $\alpha$ is dependent upon the difference between initial pressures $p_{a1}$ and $p_{a2}$ and is calculated as follows according to Equation (7):

$$\alpha = C(p_{a1} - p_{a2}) \quad (7)$$

Constant C can be determined empirically in that the pressure change differences $\Delta p$ occurring during the measuring intervals at a plurality of differently set initial pressures $p_{a1}$ and $p_{a2}$ are measured in the tight pipe network or in the individual pipe sections. The time-standardized pressure change differences are then plotted as a linear function of the difference of the initial pressure $p_{a1}$ and $p_{a2}$ and from this, constant C is determined, according to Equation (8), as the slope of the line:

$$C = \frac{\Delta p}{p_{a1} - p_{a2}} \quad (8)$$

The invention is not limited to the above described embodiment. For example, the stated values for the time and pressure intervals are not obligatory, rather they are adapted to local conditions of the pipe network and the type and quantity of the liquid. It is also not obligatory to determine the pressure change difference by setting an initially high and then low initial pressure in successive measuring intervals. The reverse setting of the initial pressures brings the same results. The invention is also not limited to the determination of the pressure change difference in two or three measuring intervals and only two initial pressure stages. For example, a plurality of mutually different initial pressure values can be set in a plurality of measuring intervals. Likewise, the selection of measuring intervals of identical time duration is not obligatory. If the time duration of the inidividual measuring intervals is selected to be different, the pressure changes, the pressure change difference and the allowed value as well as the estimated leakage quantity must be standardized, i.e. must refer to the same unit of time. Detected pressure changes must then additionally be divided by the time duration of the individual measuring intervals and multiplied by the reference unit of time. This changes nothing in the method itself. The calculation of the allowed value and the estimation of the leakage quantity is then made with the reference unit of time. Synonymous with this is a determination of the slope of the pressure curve at given moments during the measuring interval, i.e. a determination of the time differential of the pressure.

In connection with the leak check it is also possible to detect as the pressure change, not a drop in pressure, but an increase in pressure. This is the case if, for example, the temperature of the liquid is initially cooler than the environment of the pipe. However, due to the pressure change differences between the pressure changes at two different initial pressures, which always occur if there is a leak, the leak is reliably detected.

The method according to the invention is suitable not only for the detection of leaks in liquid filled pipes or pipe networks as represented by the described refueling system. The method can also be used to leak check empty pipes or those intended to transport gas or dust. In this case, the pipes or pipe networks, possibly with subdivision into pipe sections, must be filled with liquid and their ends must be sealed.

We claim:

1. Method for checking at least one isolatable section of a pipe or pipe network for leaks, comprising filling the section with a liquid, and effecting at least one pressure change determination by the steps of: placing the liquid in the section at a first initial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section, wherein said step of effecting at least one pressure change determination further comprises: again placing the liquid in the section at the first initial pressure value after the second measuring interval and then detecting the change in pressure from the first initial value during a third measuring interval; said step of providing representations comprises deriving, from the pressure changes detected during the first and third intervals, as the adjusted representation of the change in pressure from the first initial value, a representation of an approximation of the pressure change from the first initial pressure value which would occur during the second measuring interval.

2. A method as defined in claim 1 wherein the first and second measuring intervals are of identical duration, and the allowed pressure change difference value is time standardized to the same duration.

3. A method as defined in claim 1 wherein the time standardized allowed pressure change difference value is set to approximately zero.

4. A method as defined in claim 1 wherein each of the initial pressure values is less than 10 bar and the ratio of one initial pressure value to the other is approximately 1:3.

5. A method as defined in claim 1 further comprising, before effecting at least one pressure change determination, hermetically sealing the section and said steps of effecting at least one pressure change determination are carried out while the section remains hermetically sealed.

6. Method for checking at least one isolatable section of a pipe or pipe network for leaks, comprising filling the section with a liquid, and effecting at least one pressure change determination by the steps of: placing the liquid in the section at a first initial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section, wherein the size of the isolatable pipe section is selected in such a way that the liquid volume enclosed therein is sufficiently small compared to the resolution of the pressure measurement and of the smallest leakage flow that can be detected.

7. Method for checking at least one isolatable section of a pipe or pipe network for leaks, comprising filling the section with a liquid, and effecting at least one pressure change determination by the steps of: placing the liquid in the section at a first intial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section, wherein said step of providing representations is carried out, for the representation associated with at least one interval, by a calculation which is based on a plurality of pressure values measured during the associated interval and which minimizes the influence of unavoidable measuring errors.

8. Method for checking at least one isolatable section of a pipe or pipe network for leaks, comprising filling the section with a liquid, and effecting at least one pressure change determination by the steps of: placing the liquid in the section at a first initial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section, wherein said step of forming a representation of a time standardized allowed pressure change difference value comprises calculating that value on the basis of selected values for the permissible maximum leakage flow from the section, the maximum operating pressure in the section, the liquid volume of the section, the duration of each measuring interval, and each initial pressure value.

9. Method for checking at least one isolatable section of a pipe or pipe network for leaks, comprising filling the section with a liquid, and effecting at least one pressure change determination by the steps of: placing the liquid in the section at a first intial pressure value and then detecting the change in pressure from the first initial value during a first measuring interval; placing the liquid in the section at a second initial pressure value different from the first initial pressure value and then detecting the change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; comparing the pressure change difference value representation with the allowed value representation to determine the existence of a leak in the section; and providing a representation of the estimated quantity of liquid which would leak from the section during a reference time period and when under normal operating pressure by forming the product of the time standardized pressure change difference value, the reciprocal of the difference between the square roots of the first and second initial pressure values, and a constant which is characteristic of the particular section.

10. A method as defined in claim 9 wherein the constant is the product of: a preliminary constant which is a function of the geometry and material composition of the section and the compressibility of the liquid; the liquid volume in the section; and the square root of the normal operating pressure in the section.

11. Method for checking at least one isolatable section of a pipe or pipe network for leaks, comprising filling the section with a liquid, and effecting at least one pressure change determination by the steps of: placing the liquid in the section at a first intial pressure value and then detecting the change in pressure from the first initial value during a first measuring interval; placing the liquid in the section at a second initial pressure value different from the first initial pressure value and then detecting theh change in pressure from the second initial value during a second measuring interval; providing representations of the changes in pressure from the first and second initial pressure values, adjusted to a common time standard; forming a representation of a time standardized pressure change difference value from the adjusted representations of the changes in pressure; forming a representation of a time standardized allowed pressure change difference value; and comparing the pressure change difference value representation with the allowed value representation to determine the existence of a leak in the section, wherein said step of comparing comprises reducing the pressure change difference value representation by a correction factor proportional to the difference between the first and second initial pressure values.

12. A method as defined in claim 11 wherein the correction factor is equal to the product of a constant and the difference between the first and second initial pressure values.

13. A method as defined in claim 12 wherein the value of the constant is determined by performing a plurality of pressure change determinations on the section when it is leak-free at different initial pressure values and determining pressure change difference values based on those initial pressure values.

* * * * *